Dec. 3, 1968          A. S. VOLPIN          3,414,002

AUTOMATIC TWO-WAY LUBRICANT-SEALED PLUG VALVE

Filed June 17, 1966          2 Sheets-Sheet 1

Alexander S. Volpin
INVENTOR

BY

ATTORNEY

Dec. 3, 1968        A. S. VOLPIN        3,414,002
AUTOMATIC TWO-WAY LUBRICANT-SEALED PLUG VALVE
Filed June 17, 1966        2 Sheets-Sheet 2
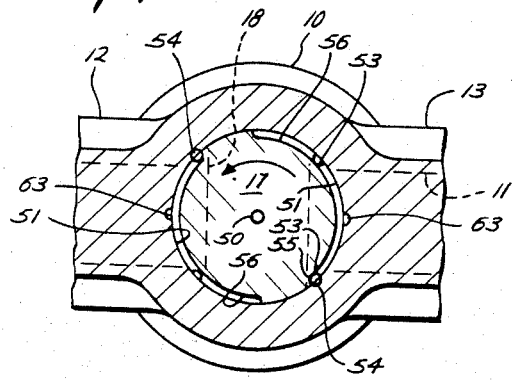
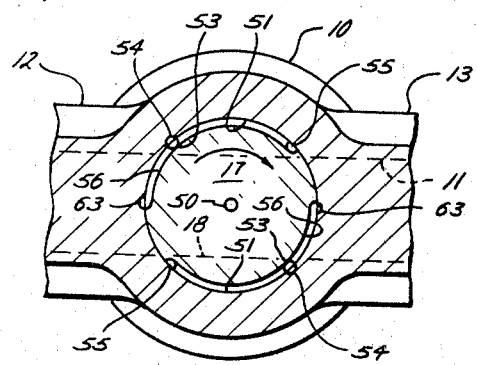
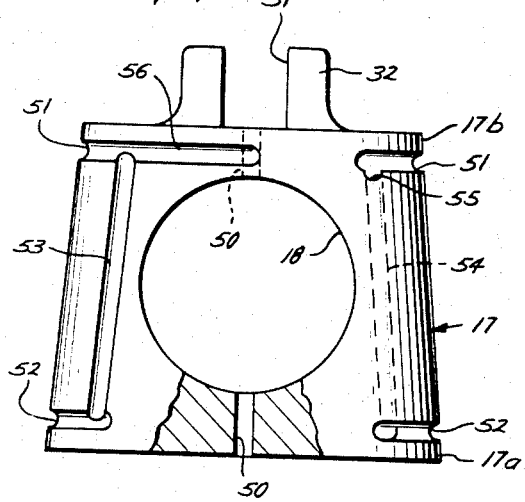
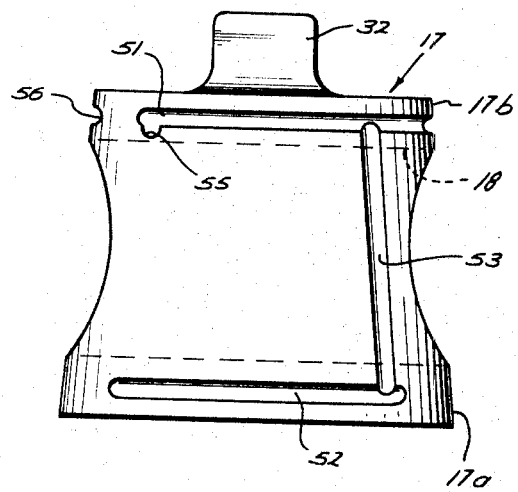
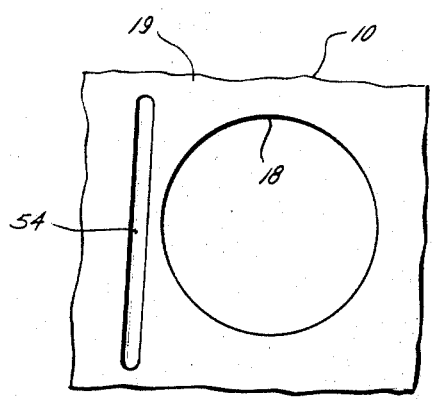
Alexander S. Volpin
INVENTOR
BY
ATTORNEY

United States Patent Office 3,414,002
Patented Dec. 3, 1968

3,414,002
AUTOMATIC TWO-WAY LUBRICANT-SEALED
PLUG VALVE
Alexander S. Volpin, 10200 W. Broadview Drive,
Miami Beach, Fla. 33154
Filed June 17, 1966, Ser. No. 558,410
13 Claims. (Cl. 137—246.12)

This invention relates to automatic lubricant-sealed valves, and more particularly to automatic sealant-sealed plug valves.

A primary object of this invention is to provide an automatic sealant-sealed plug valve in which the valve is sealed both in the open and closed position and by the use of a single sealant reservoir.

In automatic sealant-sealing of valves, both gate and plug valves, the sealant is ordinarily urged into the downstream sealing grooves by the differential pressure between the upstream and downstream sides of the valve when the latter is in the closed position. This differential is usually relatively small due to the restricted passages and resultant friction losses in the passages through which the differentials are generated.

An important object, therefore, of the present invention is to provide in a plug-type valve an automatic sealing system in which the differential pressures employed for displacing sealant from the reservoir to the sealing grooves is greatly increased through the employment of a differential area sealant-displacing barrier or piston exposed both to the differential between the upstream and downstream pressures and to the differential pressure between the upstream pressure and the atmospheric pressure exteriorly of the valve.

A further object is the provision in a plug valve of an automatic sealing system employing a single sealant reservoir and a sealant passage system connected therewith operative to communicate the reservoir with the sealing grooves on both the upstream and downstream sides of the valves at the same time.

An additional object is the provision of an automatic plug valve sealing system wherein that portion of the sealing groove system which is exposed to washing by the line fluid turbulence as the valve is moved to a terminal position is thereafter pressurized by sealant from the reservoir to purge the groove system of any entrapped line fluid and to replace the same with uncontaminated sealant.

Still another object is to provide in an automatic sealant-sealed plug valve an arrangement employing the pressure of sealant introduced into the reservoir for unseating the plug to release it in the event it should become stuck.

Yet another object is the provision in an automatic sealant-sealed plug valve of a sealing groove communicating with the sealant reservoir and arranged to permit displacement of entrapped line fluid from the groove portions in the valve housing, replacement thereby with fresh sealant, and subsequently preventing intrusion of line fluid into the grooves during extended valve open periods.

Another object is the provision of means for producing an observable indication when the sealant reservoir requires filling.

Other and more specific objects and advantages of this invention will become more readily apparent from the following detailed description when read in conjunction with the accompanying drawing which illustrates a preferred embodiment in accordance with this invention.

In the drawings:

FIG. 4 is a horizontal, cross-sectional view taken along line 4—4 of FIG. 1 with the plug member in the valve-closed position;

FIG. 4A is a view similar to FIG. 4 with the plug member in the valve-open position;

FIG. 5 is an elevational view of the plug member having a portion thereof broken away and viewed in the direction of the flow port axis therethrough;

FIG. 6 is an elevational view of the plug member viewed at right angles to that of FIG. 5; and FIG. 7 is a fragmentary elevational view looking toward the inner surface of the valve body.

Figure 1:
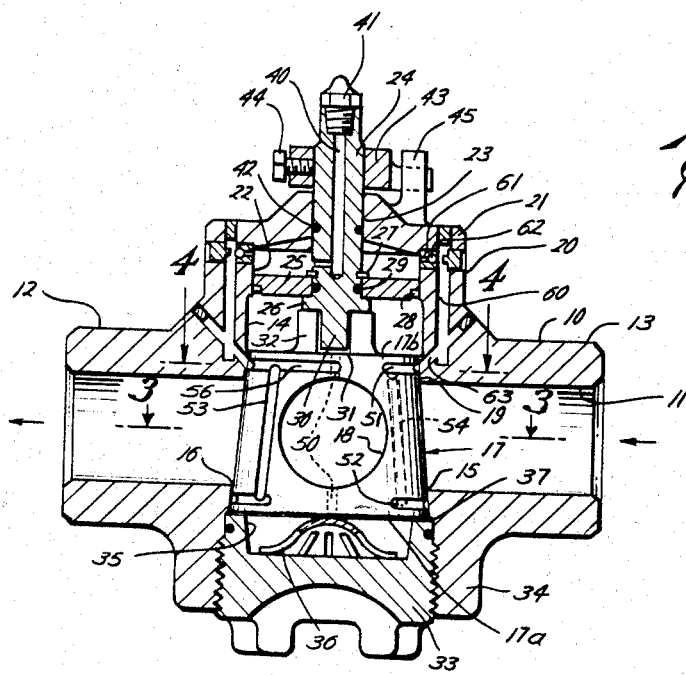
FIG. 1 is a longitudinal, vertical cross-sectional view of a plug valve in accordance with this invention.

Referring to the drawing, the valve casing 10 is provided with a flowway 11 passing through end connections 12 and 13, either of which may be the inlet and the other the outlet. End connections may be internally or externally threaded, flanged or otherwise suitably constructed for connection into a fluid pipe line or manifold. A plug chamber 14 intersects flowway 11 providing the opposite flow ports 15 and 16 and definining a tapered seat 19 adapted to receive a rotatable, generally frusto conical plug member 17 having a transverse flow port 18 therethrough adapted to register with ports 15 and 16 when the plug member is rotated to the open position. (FIGS. 3A and 4A).

For the purposes of this description, the larger lower end portion of the plug member underlying flow port 18 is designated by the numeral 17a, while the small upper end portion, generally above flow port 18, is designated by the numeral 17b.

Casing 10 is provided with an integrally formed upwardly extending hollow boss 20 closed at its upper end by a bonnet 21. The bore of boss 20 below bonnet 21 defines an upward extension of plug chamber 14 and forms a sealant reservoir 22. Bonnet 21 has an axial opening 23 to receive a cylindrical operating stem 24 which extends inwardly through reservoir 22 into the upper end of plug chamber 14. The inner portion of stem 24 carries an annular barrier or piston 25 supported on a shoulder 26 carried by the stem and releasably locked on the stem by a lock ring 27. The outer periphery of piston 25 carries an annular packing 28 arranged to slidably seal with the wall of reservoir 22. An annular seal means 29 is arranged between the inner periphery of pitson 25 and stem 24 to seal against fluid leakage therebetween. The lower end of stem 24 below piston 25 carries a downwardly extending flatsided key 30 which is receivable in a correspondingly shaped key slot 31 formed in an upwardly extending boss 32 carried by the upper end of plug member 17. Thus, there is provided a steam-to-plug connection whereby rotation of steam 24 will transmit corresponding rotary movement to plug member 17 for moving the plug member between valve-opening and valve-closing positions with respect to flowway 11, while permitting relative longitudinal movement between the stem and plug member for purposes to be explained hereinafter. The lower end of plug chamber 14 is closed by means of a closure plug 33 threaded into a downwardly extending boss 34 carried by the lower end of body 10. The upper end of closure plug 33 is provided with a recess 35 in which a dome-shaped spring 36 is mounted to bear against the lower end of plug member 17 and bias the plug member upwardly into close seating engagement on seat 19. A small clearance space 37 is provided between the upper end of closure plug 33 and the lower end face of plug member 17 to permit a limited amount of downward or unseating movement of the plug member in a manner and for the purposes to be subsequently described.

Stem 24 is provided with an axial channel 40 communicating at its inner end with reservoir 22 above piston 25 and connected at its outer end with a conventional pressure-type grease or lubricant fitting 41 through which sealant material may be introduced under pressure into reservoir 22. An annular packing 42 is arranged between the exterior of steam 24 and bore 23 of the bonnet to provide a slidable fluid-tight seal between the stem and the bonnet. The outer portion of stem 24 arrives an indicator arm 43 which is adjustably secured thereto by means of a set screw 44 and extends laterally from the stem for engagement with a stop lug 45 extending upwardly from bonnet 21 in laterally spaced relation to steam 24. The indicator arm functions to indicate the vertical movements of stem 24 relative to the bonnet for purposes to appear hereinafter, and also cooperates with stop lug 45 to limit the rotational movement of the plug between its fully open and fully closed positions which will normally encompass an angular movement of 90°.

A leak interceptor passage 50 extends axially entirely through plug member 17, being intersected by flow port 18. Passage 50 functions, when the plug member is in the closed position, to transmit upstream pressure leaking into the housing directly against the lower face of piston 25, for purposes to appear more fully hereinafter, and also provides hydraulic forces operable, by reason of the difference in areas between the upper and lower ends of the plug member, to bias the plug member into tight engagement on seat 19 to thereby prevent loss of sealant between the plug member and seat.

Plug member 17 and plug seat 19 are provided with sealing groove systems for both the upstream and downstream sides of the valve of appropriate annular form adapted to provide means for forming a continuous plastic seal about flow ports 15 and 16. These systems are identical and are each connected to a common single sealant reservoir 22 by identical passage systems. Because of the identity of the groove and passage systems communicating with the reservoir, only one will be described in detail, it being understood that this description will be applicable also to the other system.

Each of the groove systems for sealing the respective flow ports comprises an arrangement of groove segments of generally trapezoidal shape disposed in the exterior of plug member 17 on opposite sides of flow port 18 and are adapted, when the plug member is in the port-closing position, to encircle the flow ports 15 and 16. Each of the groove systems comprise a three-segment portion disposed on the exterior of the plug member (FIG. 6) and consisting of an upper horizontal groove segment 51 and a lower horizontal groove segment 52 connected at adjacent ends by a vertically extending groove segment 53. The fourth side of the annular groove system is formed by a generally vertical groove 54 cut into the wall of seat 19 (FIG. 7) and disposed to register with the otherwise free ends of horizontal grooves 51 and 52 to complete the sealing groove circuit about a flow port when the plug member is in the flowway-closing position (FIG. 5). The upper end of seat groove 54 is made to terminate slightly below upper groove segment 51 so that there is no communication between groove 54 and groove segment 51, except at the terminal closed position of the plug member (FIGS. 4 and 5), as noted below. For this purpose upper groove segment 51 is provided with a short depending groove 55 which functions as a jumper or bridging recess to establish communication between upper groove segment 51 and the upper end of groove 54 at the terminal closed position of the plug member as may best be seen in FIGS. 4 and 5. Upper groove segment 51 is also provided with a circumferential extension segment 56 which extends past the point of connection of groove segment 53 with groove segment 51 an angular distance of about 45° to a point on a line substantially coincident with the vertical central plane of opening 18. The purpose of this extension segment will be explained more fully hereinafter.

The sealant passage system communicating sealant reservoir 22 with each of the sealing groove systems heretofore described, comprise a passage segment 60 extending generally vertically through the wall of boss 21 and communicating at its upper end through a lateral passage 61 with the interior of reservoir 22. A ball check valve 62 is mounted in lateral passage 61 and arranged to permit outward flow of sealant from the reservoir into passage 60, while preventing reverse flow of fluid toward the reservoir. The lower end of passage 60 is connected, by means of a passage segment 63, with the interior of seat 19 at a point adapted to register with upper horizontal groove segment 51, as best seen in FIGS. 1, 2, 4 and 4A.

In operation, starting with the valve in the closed position illustrated in FIG. 1, reservoir 22 will have been filled with plastic sealant supplied through fitting 41 and passage 40 causing piston 25, together with stem 24, to be moved to its lowermost position, shown in FIG. 1. When plug member 17 has been turned to the flowway-closing position from the flowway-opening position a differential pressure will immediately be generated across the valve; that is, upstream pressure (flow as indicated by the arrows in FIG. 1) will act against the opposed side of plug member 17 and will tend to leak past the plug member momentarily into the plug chamber. This line pressure will flow through leak interceptor passage 50 and will act directly against the lower end face of piston 25. This will, of course, generate a differential in pressure between the upstream pressure acting against the lower face of piston 25 and the downstream pressure acting against the upper face of piston 25 through the downstream sealing groove system and related passages communicating with the reservoir. This pressure differential will be greatly intensified by the fact that piston 25 is, in effect, a dual area piston, having a second and substantially smaller area corresponding to the cross section of stem 24 at seal 42 exposed to the atmospheric pressure externally of the valve. Thus, the arrangement described previously will greatly increase the pressure differential acting through piston 25 upon the sealant in reservoir 22 which will urge the sealant under high pressure through the communicating passage system into the downstream groove system. The high pressure sealant thus injected in the groove system will displace any line fluid which was initially trapped in the groove system and substitute therefor the more viscous sealing material. At the same time, sealant will be forced through the upstream passage system into the upstream sealing system, similarly forming a seal about the upstream passageway by reason of the differential pressure existing between the upstream pressure and atmospheric pressure, as noted previously.

Figure 3:
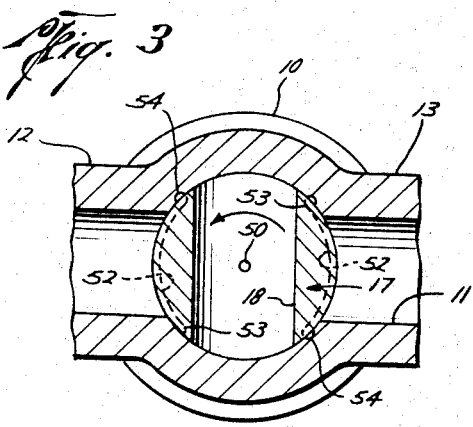
FIG. 3 is a horizontal, cross-sectional view taken along line 3—3 of FIG. 1, showing the plug member in the valve-closed position.
Figure 2:
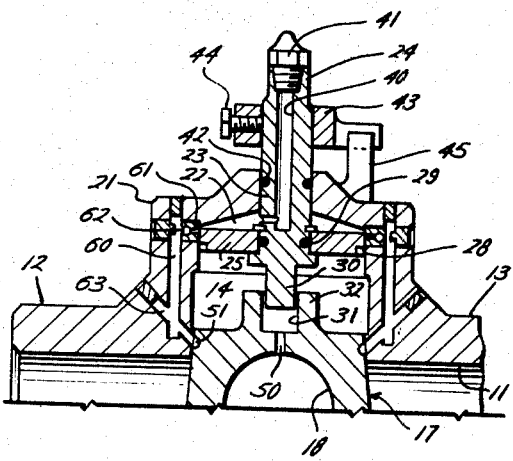
FIG. 2 is a partial view of the upper portion of the valve shown in FIG. 1, showing another position of the sealant displacing barrier.
Figure 3A:
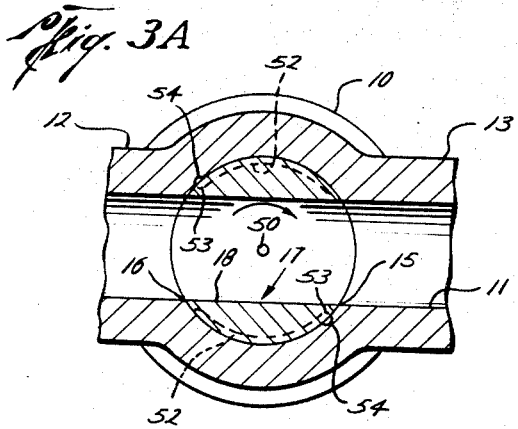
FIG. 3A is a view similar to FIG. 3, but showing the plug member in the valve-open position.

As will best be seen in FIGS. 3 and 4, when the plug member is in the closed position, upper groove segment 51 will be in communication with seat groove 54 through jumper 55 and will also, of course, be in communication with passage segment 63 leading from the reservoir. Thus, sealant will be able to flow throughout the entire circuit represented by upper and lower groove segments 51 and 52, vertical segment 53, jumper 55 and seat groove 54. At this position of the plug member, extension segment 56 of the upper groove segment will be inactive, having no other communication with any other groove segment. It will be noted also that indicator arm 43 will be in abutting engagement with lug 45 thus stopping the rotation of the plug member at the fully closed position.

As the plug member is rotated from the closed to the open position, shown in FIGS. 3A and 4A, the initial angular movement of the plug member will immediately break the connection between jumper 55 and seat groove 54, thereby cutting off the flow of sealant through the sealing groove system. As the plug member continues to be rotated toward the open position, seat grooves 54 will be exposed to the turbulent washing action of the line fluid beginning to flow through the valve ports, which will tend to wash the sealant out of these seat grooves. However, as the plug member completes its rotation to its terminal fully open position, shown in FIGS. 3A and 4A, extension segments 56 will have moved into communication with the ends of sealant passage segments 63 whereupon the pressure differentials across the valve, previously mentioned, will force sealant through the sealant passages into extension segments 56 and thence into seat passages 54 as soon as vertical groove segments 53 come into registration with seat grooves 54. The sealant, being more viscous than the line fluid which will have entered seat grooves 54, will displace the latter, forcing it out of the seat grooves between the surfaces of the plug member and the seat, thereby not only removing the non-sealant material from the groove, but replacing it with the more viscous sealant material. At the same time, with the registering vertical grooves thus filled with sealant material, the latter will prevent incursion therein of further line fluid, particularly during periods when the valve may be maintained in its open position for long periods of time.

The movement of sealant into seat groove 54 upon the opening of the valve can only occur when the plug member has reached its terminal fully opened position, for until that point in its travel vertical groove segment 53 will be out of communication with seat groove 54. Hence, no sealant can flow into the latter until the registering movement occurs. By appropriately selecting the length of extension 56 in relation to the several passages and groove segments, loss of sealant will be prevented because sealant can move out of the reservoir passages only when grooves 53 and 54 are in registration.

As sealant is used up from reservoir 22, as a result of operation of the valve, piston 25 will move upwardly in reservoir 22 a corresponding amount and will at the same time elevate stem 24 to a corresponding extent. This upward movement (FIG. 2) of the steam will be indicated by the change in the vertical position of indicator arm 43 relative to lug 45 and will thus provide a readily visible indication to an operator that refilling of the reservoir is required.

Another feature of the valve construction heretofore described is that which enables freeing of the plug member in the event it is "frozen" on its seat. This is accomplished by, in effect, overfilling reservoir 22 with sealant introduced under pressure through fitting 41. Such overfilling will force piston 25 downwardly sufficiently to cause shoulder 26 on the stem to be thrust against the upper end of boss 32 and force plug member 17 downwardly for the distance provided by clearance 37, which will ordinarily be sufficient to free the plug member for easy rotation.

It will be understood that various other alterations and modifications may be made in the details of the illustrative embodiment within the scope of the appended claims but without departing from the spirit of this invention.

What I claim and desire to secure by Letters Patent is:

1. An automatic two-way sealant-sealed plug valve, including
   (a) a housing having opposed flow ports therein,
   (b) a plug member rotatable in said housing between positions opening and closing said flow ports,
   (c) sealing groove systems to distribute sealant material about each flow port,
   (d) a sealant reservoir in the housing,
   (e) separate passage means connecting each of said sealing groove systems to said reservoir,
   (f) a dual-area sealant-displacing barrier member having a plug member-actuating stem secured thereto both slidably disposed in said reservoir.
   (g) said barrier member having a larger pressure-active area exposed to line fluid pressure in said housing and a smaller pressure-active area exposed to atmospheric pressure exteriorly of said housing, and
   (h) means for introducing sealant material into said reservoir.

2. A plug valve according to claim 1, wherein each of said sealing groove systems comprises a first segment disposed in the wall of the housing and a second segment disposed on the plug member for rotation therewith into and out of communication with the first segment, said segments being arranged to communicate only at the terminal port-opening and port-closing positions of said plug member.

3. A plug valve according to claim 2, wherein said first segment is a generally vertical groove, and said second segment is generally C-shaped, comprising substantially horizontal upper and lower groove portions and a generally vertical groove portion connecting said horizontal portions at one end, said segments being so-arranged as to communicate the opposite ends of said horizontal portions with said first segment at the terminal fully closed positions of said plug member and to dispose said vertical groove portion in registration with said first segment at the terminal fully open position of said plug member whereby to prevent intrusion of line fluid into said first segment when the plug member is in the port-opening position.

4. A plug valve according to claim 1, wherein said plug member is provided with leak-interceptor passageway extending longitudinally thereof for directing line fluid pressure interiorly of said housing against said larger pressure-active area of the barrier.

5. In a plug valve according to claim 1,
   (a) said plug member-actuating stem extending through the housing to the exterior thereof,
   (b) means operably connecting the stem to the plug member,
   (c) an annular enlargement carried by said stem and defining said larger pressure-active area, and
   (d) said stem including a transverse section defining said smaller pressure-active area.

6. A plug valve according to claim 5, wherein said means connecting the stem to the plug member comprises cooperating relatively non-rotative but longitudinally slidable elements.

7. A plug valve according to claim 6, wherein said plug member is tapered and said connection means includes cooperable abutment means on said stem and plug member operable to apply unseating thrust against said plug member in response to sealant pressure on said barrier member, and resilient means in said housing urging said plug member against said housing seat.

8. An automatic two-way sealant-sealed plug valve, including
   (a) a housing having opposed flow ports therein,
   (b) a plug seat in the housing between said flow ports,
   (c) a plug member rotatable in said seat between positions opening and closing said flow ports,
   (d) a sealing groove system arranged between the plug member and said seat to distribute sealant material about the downstream flow port in response to line pressure,
   (e) a sealant reservoir in the housing above the plug member,
   (f) separate passage means connecting said sealing groove system to said reservoir,
   (g) a dual-area sealant-displacing barrier member slidably disposed in said reservoir,
   (h) an operating stem slidably extending into the housing and secured to said barrier member for movement therewith,
   (i) means forming a relatively non-rotative, longitudinally slidable connection between the stem and the plug member,
   (j) said barrier member having a larger pressure-active area exposed to line fluid pressure in said housing, and a smaller pressure-active area defined by a section of said stem exposed to atmospheric pressure exteriorly of said housing, and (k) means for introducing sealant material into said reservoir.

9. A plug valve according to claim 8, wherein said stem and said housing carry related indicator elements operable in response to relative movement of stem to indicate changes in volume of sealant in said reservoir.

10. A plug valve according to claim 8, wherein said sealing groove system comprises a first segment disposed in said seat and a second segment disposed on the exterior of the plug member for rotation therewith into and out of communication with the first segment, said segments being arranged to communicate only at the terminal port-opening and port-closing positions of said plug member.

11. In a sealant-sealed plug valve,
(a) a ported housing having a chamber and a rotatable plug therein,
(b) a transverse passage through said plug to selectively control fluid flow therethrough,
(c) a sealant reservoir in said housing,
(d) passage means to feed sealant from said reservoir to sealing areas about said plug and housing,
(e) a slidable barrier in said reservoir exposed on one side thereof to line pressure entering said chamber,
(f) a first surface on the opposite side of said barrier exposed to sealant in said reservoir,
(g) a second surface carried on said opposite side defining a cylindrical stem member secured to said barrier for movement therewith and extending through said housing, and
(h) means on said stem member to facilitate rotational movement of said plug.

12. In an automatic sealant-sealed valve having a ported housing and a movable closure to control fluid flow therethrough,
(a) a sealant reservoir in said housing,
(b) a slidable barrier in said reservoir,
(c) means to distribute sealant from said reservoir to sealing areas about said closure,
(d) a portion of said barrier forming an operating stem extending through said housing and sealed therewith,
(e) means carried by said barrier to transmit movement of said stem to said closure, and
(f) additional means carried by said barrier exteriorly of said housing to visually indicate the approximate volume of sealant existing in said reservoir.

13. In an automatic sealant-sealed valve having a ported housing and a cooperating movable closure therein,
(a) means to seal said valve including
(b) a sealant reservoir in said housing,
(c) means to distribute sealant from said reservoir to sealing areas about said closure,
(d) a slidable barrier disposed in said reservoir, and
(e) stem means secured to said barrier for movement therewith and extending through said housing,
(f) means carried by said barrier to transmit movement of said stem to said closure.

References Cited
UNITED STATES PATENTS

| | | | |
|---|---|---|---|
| 2,065,726 | 12/1936 | Nordstrom | 137—246.12 |
| 2,187,926 | 1/1940 | Aikman | 137—246.12 |
| 2,300,835 | 11/1942 | Volpin | 137—246.12 |
| 2,332,282 | 10/1943 | Volpin | 137—246.12 |
| 2,360,599 | 10/1944 | Volpin | 137—246.12 X |
| 2,572,894 | 10/1951 | Volpin | 137—246.12 X |
| 2,986,156 | 5/1961 | Volpin | 137—246.12 |
| 2,999,510 | 9/1961 | Volpin | 137—246.12 |
| 3,067,763 | 12/1962 | Bredtschneider | 137—246.11 |

CLARENCE R. GORDON, *Primary Examiner.*